(12) United States Patent
Yoon et al.

(10) Patent No.: US 12,212,043 B2
(45) Date of Patent: Jan. 28, 2025

(54) ELECTRONIC DEVICE

(71) Applicants: Samsung Display Co., Ltd., Yongin-Si (KR); Seoul National University R&DB Foundation, Seoul (KR)

(72) Inventors: Sangrock Yoon, Hwaseong-si (KR); Kiseo Kim, Yongin-si (KR); Eunjin Sung, Yongin-si (KR); Byeongjin Kim, Seoul (KR); Jungsuek Oh, Seoul (KR); Jeongtaek Oh, Seoul (KR); Seungwook Chun, Daegu (KR)

(73) Assignees: Samsung Display Co., Ltd., Yongin-Si (KR); Seoul National University R&DB Foundation, Seoul (KR)

( * ) Notice: Subject to any disclaimer, the term of this patent is extended or adjusted under 35 U.S.C. 154(b) by 65 days.

(21) Appl. No.: 17/861,517

(22) Filed: Jul. 11, 2022

(65) Prior Publication Data
US 2023/0127988 A1 Apr. 27, 2023

(30) Foreign Application Priority Data
Oct. 22, 2021 (KR) .................... 10-2021-0141905

(51) Int. Cl.
*H01Q 1/24* (2006.01)
*H01Q 1/40* (2006.01)
*H01Q 13/08* (2006.01)

(52) U.S. Cl.
CPC .............. *H01Q 1/243* (2013.01); *H01Q 1/40* (2013.01); *H01Q 13/08* (2013.01)

(58) Field of Classification Search
CPC ........... H01Q 1/243; H01Q 1/40; H01Q 13/08
See application file for complete search history.

(56) References Cited

U.S. PATENT DOCUMENTS

| | | | |
|---|---|---|---|
| 10,686,246 B2 | 6/2020 | Park et al. | |
| 10,862,216 B1* | 12/2020 | Ayala Vazquez | H01Q 21/28 |
| 2018/0309194 A1* | 10/2018 | Wang | H01Q 1/273 |
| 2021/0013626 A1* | 1/2021 | Jang | H01Q 1/2258 |
| 2023/0208958 A1* | 6/2023 | Sung | H01Q 23/00 455/566 |

FOREIGN PATENT DOCUMENTS

| | | |
|---|---|---|
| KR | 10-2019-0029402 A | 3/2019 |
| KR | 10-2126564 B1 | 6/2020 |
| KR | 10-2021-0007526 A | 1/2021 |

OTHER PUBLICATIONS

Junho Park et al., "An Optically Invisible Antenna-on-Display Concept for Millimeter-Wave 5G Cellular Devices", IEEE Transactions on Antennas and Propagation, May 2019, pp. 2942-2952, vol. 67, No. 5.

* cited by examiner

*Primary Examiner* — Dameon E Levi
*Assistant Examiner* — Leah Rosenberg
(74) *Attorney, Agent, or Firm* — Innovation Counsel LLP

(57) ABSTRACT

Disclosed is an electronic device that includes a window, a display panel that is disposed under the window and that has a display area and a non-display area defined therein, a lower member that is disposed under the display panel and that includes a lower conductive layer, a transmission line disposed between the display panel and the lower member, a conductive partition wall spaced apart from the transmission line and disposed to overlap the display area, and a housing coupled with the window to define a receiving space in which the display panel, the lower member, and the transmission line are disposed.

14 Claims, 16 Drawing Sheets

ELECTRONIC DEVICE

CROSS-REFERENCE TO RELATED APPLICATIONS

This application claims priority under 35 U.S.C. § 119 to Korean Patent Application No. 10-2021-0141905 filed on Oct. 22, 2021, in the Korean Intellectual Property Office, the disclosures of which are incorporated by reference herein in their entireties.

BACKGROUND

The present disclosure generally relates to an electronic device. More particularly, the present disclosure relates to an electronic device capable of wireless communication.

An electronic device supporting wireless communication may include an antenna. The antenna may transmit and receive signals in a specific frequency range by using, as a radiator, a metallic material that is disposed inside the electronic device or forms the exterior of the electronic device. The electronic device may include antennas for wireless communication, such as a cellular network, Wi-Fi, or Bluetooth.

SUMMARY

Embodiments of the present disclosure provide an electronic device capable of communication.

According to an embodiment, an electronic device includes a window, a display panel that is disposed under the window and that has a display area and a non-display area defined therein, a lower member that is disposed under the display panel and that includes a lower conductive layer, a transmission line disposed between the display panel and the lower member, a conductive partition wall spaced apart from the transmission line and disposed to overlap the display area, and a housing coupled with the window to define a receiving space in which the display panel, the lower member, and the transmission line are disposed.

Energy radiated from the transmission line may resonate in a space defined by the display area of the display panel, the lower conductive layer, the conductive partition wall, and a sidewall of the housing and may be radiated through the non-display area of the display panel.

The conductive partition wall may include a first partition wall that extends parallel to the sidewall of the housing, a second partition wall that extends from a first end portion of the first partition wall toward the sidewall of the housing, and a third partition wall that extends from a second end portion of the first partition wall toward the sidewall of the housing, the second end portion being spaced apart from the first end portion.

The conductive partition wall may include a plurality of conductive posts, and the transmission line may be surrounded by the plurality of conductive posts and the sidewall of the housing when viewed on a plane.

The conductive partition wall may extend parallel to the sidewall of the housing, and the transmission line may be disposed between the conductive partition wall and the sidewall of the housing.

The transmission line may include a plurality of transmission lines arranged to be spaced apart from each other in a direction parallel to the sidewall of the housing.

The conductive partition wall may include an outer partition wall that surrounds the plurality of transmission lines and a dividing partition wall disposed between two transmission lines adjacent to each other among the plurality of transmission lines.

The electronic device may further include a feeding line connected to the transmission line, and the lower member may have an opening defined therein through which the feeding line passes.

A slot may be defined in the lower conductive layer of the lower member, and a signal may be proximity coupled feed to the transmission line through the slot.

The transmission line and the conductive partition wall may be disposed on a same layer.

The conductive partition wall may be connected to the lower conductive layer of the lower member and the display panel.

The electronic device may further include a protective film disposed under the display panel and an antenna film that is disposed under the protective film and that has the transmission line disposed on one surface thereof, and the conductive partition wall may pass through the lower member, the antenna film, and the protective film.

The electronic device may further include a protective film disposed under the display panel and an antenna film that is disposed under the protective film and that has the transmission line disposed on one surface thereof. The conductive partition wall may include a first conductive partition wall layer disposed on the lower member, a second conductive partition wall layer disposed on the antenna film, and a third conductive partition wall layer disposed on one surface of the protective film. The second conductive partition wall layer and the third conductive partition wall layer may face each other.

The electronic device may further include a printed circuit film disposed between the display panel and the lower member, and the printed circuit film may include a first base film, a second base film that faces the first base film, and a conductive circuit layer that is disposed between the first base film and the second base film and that includes the transmission line.

The printed circuit film may further include a first conductive layer disposed on an upper surface of the first base film and a second conductive layer disposed on a lower surface of the second base film. The conductive partition wall may pass through the first base film and the second base film and may be connected to the first conductive layer and the second conductive layer.

According to an embodiment, an electronic device includes a display panel having a display area and a non-display area defined therein, a lower member that is disposed under the display panel and that includes a lower conductive layer, a transmission line disposed between the display panel and the lower member, and a conductive partition wall that is spaced apart from the transmission line and that faces a side surface of the transmission line, and energy radiated from the transmission line is radiated through the non-display area.

The conductive partition wall may include a first partition wall that extends in a first direction, a second partition wall that extends from a first end portion of the first partition wall in a second direction crossing the first direction, and a third partition wall that extends from a second end portion of the first partition wall in the second direction, the second end portion being spaced apart from the first end portion. The transmission line may be disposed between the second partition wall and the third partition wall.

The conductive partition wall may include a plurality of conductive posts arranged to surround at least a portion of the transmission line when viewed on a plane.

The transmission line may extend in a direction from the display area toward a portion of the non-display area, and the conductive partition wall may be spaced apart from a portion of the non-display area with the transmission line therebetween when viewed on a plane.

The transmission line may include a plurality of transmission lines arranged to be spaced apart from each other, and the conductive partition wall may include an outer partition wall that surrounds the plurality of transmission lines and a dividing partition wall disposed between two transmission lines adjacent to each other among the plurality of transmission lines.

The electronic device may further include a protective film disposed under the display panel and an antenna film that is disposed under the protective film and that has the transmission line disposed on one surface thereof, and the conductive partition wall may pass through the lower member, the antenna film, and the protective film.

The electronic device may further include a protective film disposed under the display panel and an antenna film that is disposed under the protective film and that has the transmission line disposed on one surface thereof. The conductive partition wall may include a first conductive partition wall layer disposed on the lower member, a second conductive partition wall layer disposed on the antenna film, and a third conductive partition wall layer disposed on one surface of the protective film. The second conductive partition wall layer and the third conductive partition wall layer may face each other.

The electronic device may further include a printed circuit film disposed between the display panel and the lower member. The printed circuit film may include a first conductive layer, a first base film, a conductive circuit layer including the transmission line, a second base film, and a second conductive layer sequentially stacked one above another. The conductive partition wall may pass through the first base film and the second base film and may be connected to the first conductive layer and the second conductive layer.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
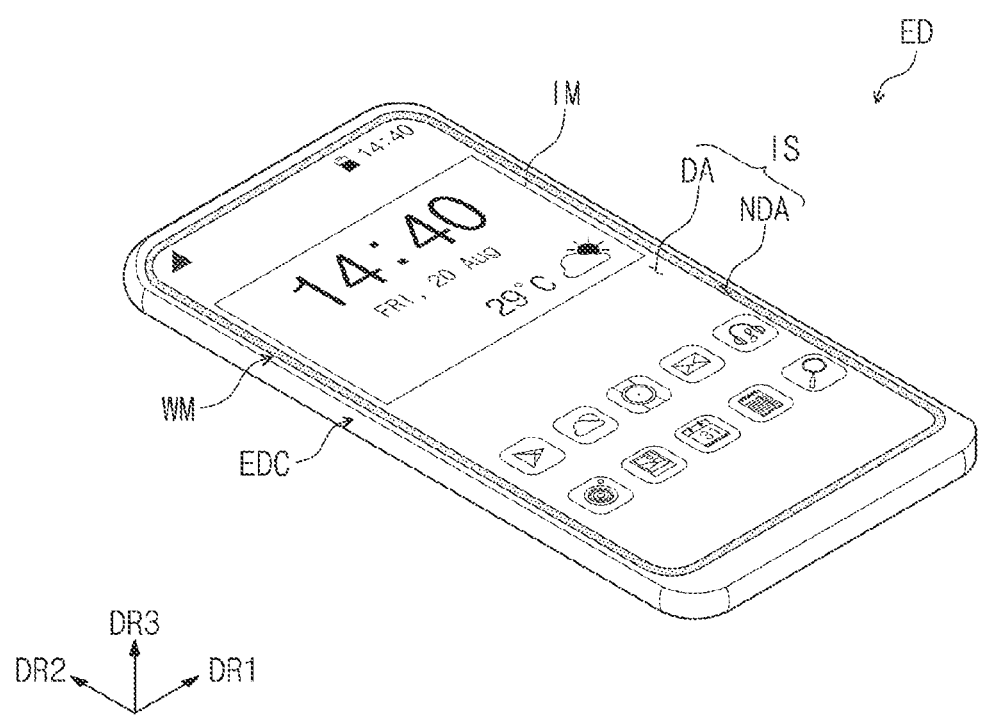
FIG. 1 is a perspective view of an electronic device according to an embodiment of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

Figure 2:
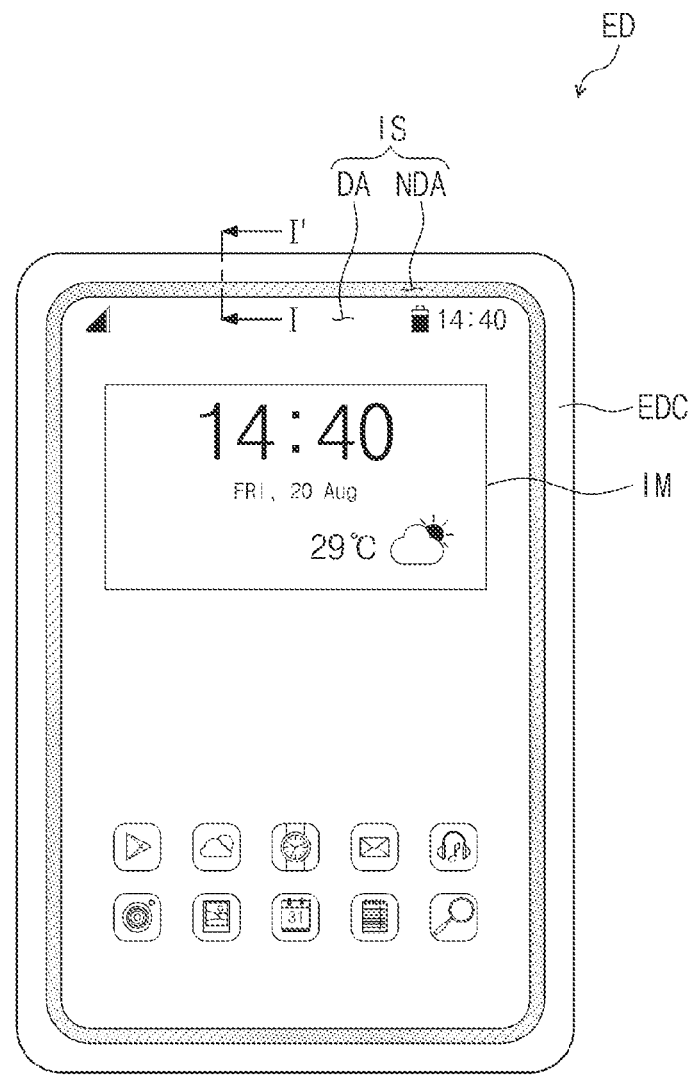
FIG. 2 is a plan view of the electronic device according to an embodiment of the present disclosure.

FIG. 1 is a perspective view of an electronic device ED according to an embodiment of the present disclosure. FIG. 2 is a plan view of the electronic device ED according to an embodiment of the present disclosure.

Referring to FIGS. 1 and 2, the electronic device ED may be a device activated depending on an electrical signal. For example, the electronic device ED may be a mobile phone, a tablet computer, a car navigation system, a game machine, or a wearable device, but is not limited thereto. FIG. 1 illustrates an example that the electronic device ED is a mobile phone.

The electronic device ED may display an image IM in a third direction DR3 on a display surface IS parallel to a first direction DR1 and a second direction DR2. The display surface IS, on which the image IM is displayed, may correspond to the front surface of the electronic device ED.

In this embodiment, front surfaces (or, upper surfaces) and rear surfaces (or, lower surfaces) of members are defined with respect to the direction in which the image IM is displayed. The front surfaces and the rear surfaces may be opposite each other in the third direction DR3, and the normal directions of the front surfaces and the rear surfaces may be parallel to the third direction DR3.

The separation distance between the front surface and the rear surface of the electronic device ED in the third direction DR3 may correspond to the thickness of the electronic device ED in the third direction DR3. Meanwhile, the directions indicated by the first, second, and third directions DR1, DR2, and DR3 may be relative concepts and may be changed to different directions.

The display surface IS of the electronic device ED may be divided into a display area DA and a non-display area NDA. The display area DA may be an area on which the image IM is displayed. A user views the image IM through the display area DA. In this embodiment, the display area DA is illustrated in a quadrilateral shape having rounded corners. However, this is illustrative, and the display area DA may have various shapes and is not limited to any one embodiment.

The non-display area NDA is adjacent to the display area DA. The non-display area NDA may have a predetermined color. The non-display area NDA may surround the display area DA. Accordingly, the shape of the display area DA may be substantially defined by the non-display area NDA. However, this is illustrative, and the non-display area NDA may be disposed adjacent to only one side of the display area DA. The electronic device ED according to an embodiment of the present disclosure may include various embodiments and is not limited to any one embodiment.

The electronic device ED includes a window WM and a housing EDC that form the exterior of the electronic device ED. The window WM and the housing EDC may be coupled to define a receiving space in which other components of the electronic device ED are accommodated. The non-display area NDA may be defined between the display area DA and the housing EDC when viewed on a plane.

The window WM may contain an optically clear insulating material. For example, the window WM may contain glass or plastic. The window WM may have a multi-layer structure or a single layer structure. For example, the window WM may include a plurality of plastic films coupled through an adhesive, or may include a glass substrate and a plastic film coupled through an adhesive.

The housing EDC may form the side surfaces and the bottom surface of the electronic device ED. A bottom portion and sidewalls of the housing EDC may contain the same material. Alternatively, the bottom portion and the sidewalls of the housing EDC may contain different materials. For example, the sidewalls of the housing EDC may contain a conductive material, and the bottom portion of the housing EDC may contain glass. However, this is illustrative, and the present disclosure is not particularly limited thereto.

Figure 3A:
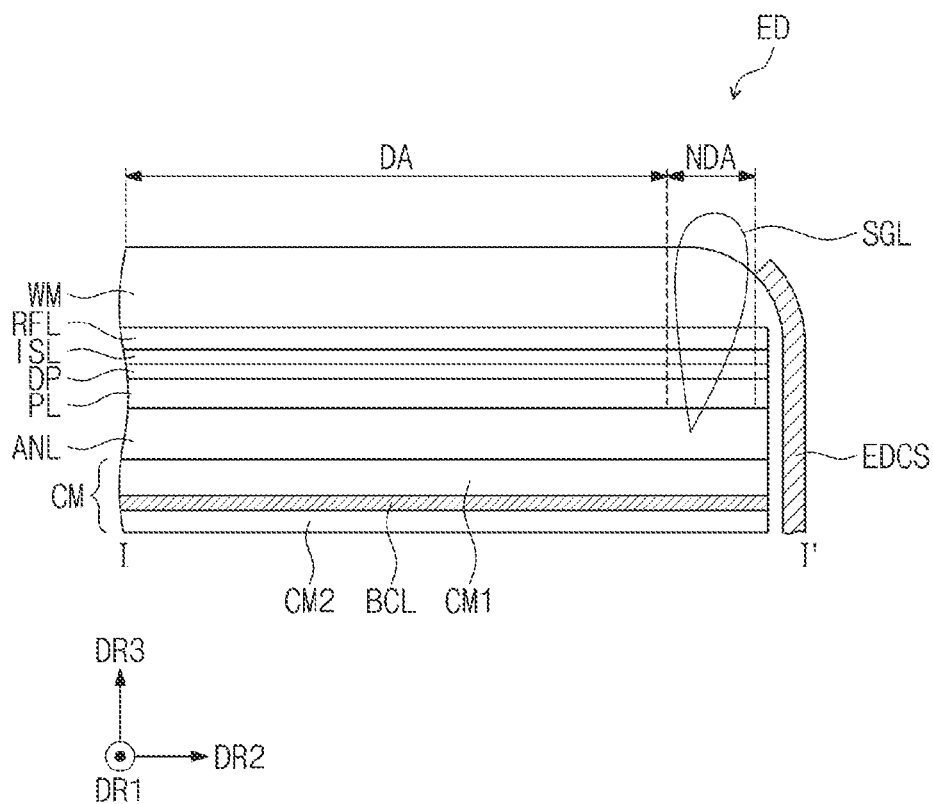
FIG. 3A is a sectional view of the electronic device according to an embodiment of the present disclosure.
Figure 3B:
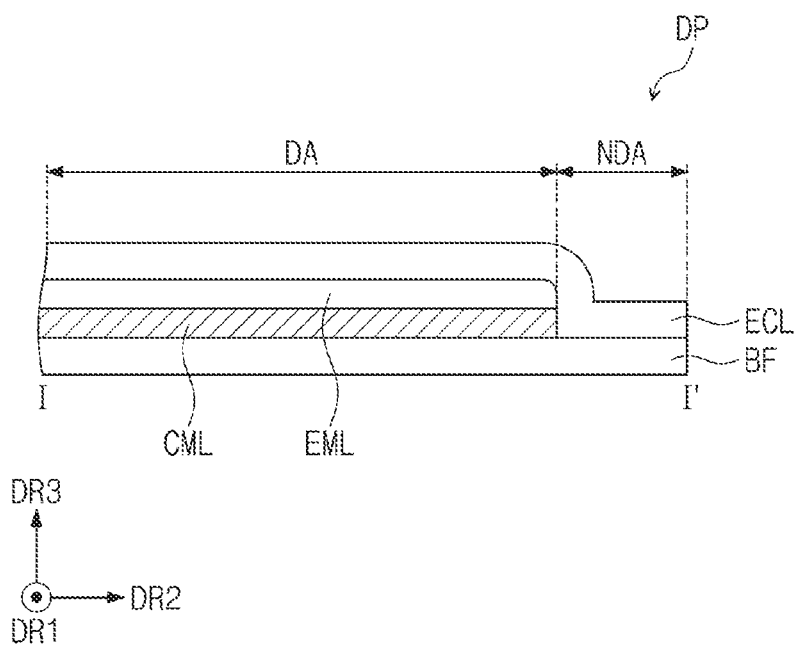
FIG. 3B is a sectional view of a display panel according to an embodiment of the present disclosure.

FIG. 3A is a sectional view of the electronic device ED according to an embodiment of the present disclosure. FIG. 3B is a sectional view of a display panel DP according to an embodiment of the present disclosure. FIGS. 3A and 3B may correspond to the section taken along line I-I' illustrated in FIG. 2.

Referring to FIGS. 3A and 3B, the electronic device ED may include the window WM, an anti-reflection layer RFL, a sensor layer ISL, the display panel DP, a protective film PL, an antenna layer ANL, a lower member CM, and the housing EDC (refer to FIG. 1). In an embodiment of the present disclosure, some of the aforementioned components may be omitted, or other components may be additionally added. An adhesive layer may be disposed between the members as needed. The adhesive layer may be an optically clear adhesive (OCA) member or a pressure sensitive adhesive (PSA) film, but is not particularly limited thereto. Adhesive layers to be described below may also contain the same material or a conventional adhesive.

The anti-reflection layer RFL may lower the reflectance of light incident from the outside. The anti-reflection layer RFL may include a phase retarder and/or a polarizer. The anti-reflection layer RFL may include at least a polarizer film. In this case, the anti-reflection layer RFL may be attached to the sensor layer ISL through an adhesive layer.

Alternatively, the anti-reflection layer RFL may include color filers. In this case, the adhesive layer between the anti-reflection layer RFL and the sensor layer ISL may be omitted. The color filters may have a predetermined arrangement. The arrangement of the color filters may be determined in consideration of emission colors of pixels included in the display panel DP. In addition, the anti-reflection layer RFL may further include a black matrix adjacent to the color filters.

In another embodiment, the anti-reflection layer RFL may include a destructive interference structure. For example, the destructive interference structure may include a first reflective layer and a second reflective layer disposed on different layers. First reflected light and second reflected light reflected from the first reflective layer and the second reflective layer, respectively, may destructively interfere with each other, and thus the reflectance of external light may be decreased. In this case, the adhesive layer between the anti-reflection layer RFL and the sensor layer ISL may be omitted.

The display panel DP may display the image IM (refer to FIG. 1). As depicted in FIG. 3B, the display panel DP may include a base layer BF, a circuit layer CML disposed on the base layer BF, a light emitting element layer EML disposed on the circuit layer CML, and an encapsulation layer ECL disposed on the light emitting element layer EML.

The base layer BF may be a member that provides a base surface on which the circuit layer CML is disposed. The base layer BF may be a flexible substrate that can be bent, folded, or rolled. The base layer BF may be a glass substrate, a metal substrate, or a polymer substrate. However, without being limited thereto, the base layer BF may be an inorganic layer, an organic layer, or a composite layer.

The circuit layer CML may be disposed on the base layer BF. The circuit layer CML may include an insulating layer, a semiconductor pattern, a conductive pattern, and a signal line. The insulating layer, a semiconductor layer, and a conductive layer may be formed on the base layer BF by coating or deposition and may be selectively subjected to patterning by performing a photolithography process a plurality of times. Thereafter, the semiconductor pattern, the conductive pattern, and the signal line included in the circuit layer CML may be formed.

The light emitting element layer EML may be disposed on the circuit layer CML. The light emitting element layer EML may include a light emitting element, and the light emitting element may include an organic light emitting material, an inorganic light emitting material, an organic-inorganic light emitting material, a quantum dot, a quantum rod, a micro LED, or a nano LED.

The encapsulation layer ECL may be disposed on the light emitting element layer EML. The encapsulation layer ECL may include an inorganic encapsulation layer and an organic encapsulation layer. The inorganic encapsulation layer may protect the light emitting element layer EML from moisture and oxygen, and the organic encapsulation layer may protect the light emitting element layer EML from foreign matter such as dust particles.

The display panel DP may include a display area DA and a non-display area NDA defined therein. The non-display area NDA may have a width of 100 µm to 300 µm, but is not particularly limited thereto. The width of the non-display area NDA may be a width parallel to a direction adjacent to the display area DA, for example, a width in the second direction DR2.

The circuit layer CML and the light emitting element layer EML may not overlap the non-display area NDA. That is, the circuit layer CML and the light emitting element layer EML may overlap the display area DA. Accordingly, conductive layers may not be disposed in the non-display area NDA of the display panel DP. The display area DA of the display panel DP may be a portion that forms a cavity. The cavity may refer to a space in which energy radiated from a transmission line included in the antenna layer ANL resonates. Conductive layers are not disposed in the non-display area NDA of the display panel DP. That is, the non-display area NDA of the display panel DP may correspond to an area where a conductor does not exist, and the energy SGL resonating in the cavity may be radiated through the non-display area NDA.

The sensor layer ISL may be disposed on the display panel DP and may sense an external input. The external input may include various forms of inputs provided from outside the electronic device ED. The sensor layer ISL according to an embodiment of the present disclosure may sense an external user input applied from the outside. The external user input may be one of various forms of external inputs, such as a part of the user's body, light, heat, gaze, and pressure, or a combination thereof.

The sensor layer ISL may be directly disposed on the display panel DP. According to an embodiment of the present disclosure, the sensor layer ISL may be formed on the display panel DP by a continuous process. That is, when the sensor layer ISL is directly disposed on the display panel DP, an internal adhesive film is not disposed between the sensor layer ISL and the display panel DP. In an embodiment, an adhesive film may be additionally disposed between the sensor layer ISL and the display panel DP. In this case, the sensor layer ISL may not be manufactured together with the display panel DP by a continuous process and may be manufactured separately from the display panel DP and then fixed to the upper surface of the display panel DP by the adhesive film.

The protective film PL may be disposed under the display panel DP. The protective film PL may protect a lower portion of the display panel DP. The protective film PL may contain a flexible synthetic resin material. The protective film PL may prevent a scratch on the rear surface of the display panel DP during a manufacturing process of the display panel DP. The protective film PL may be a colored polyimide film or a colored polyethylene terephthalate film. For example, the protective film PL may be an opaque yellow film, but is not limited thereto.

The lower member CM may be disposed under the protective film PL. The lower member CM may include a first lower layer CM1, a second lower layer CM2, and a lower conductive layer BCL. Each of the first lower layer CM1 and the second lower layer CM2 may include a cushion layer, a heat radiating layer, or an additional protective film. The lower conductive layer BCL may be disposed between the first lower layer CM1 and the second lower layer CM2. The lower conductive layer BCL may be a plate containing copper or a copper alloy. The lower conductive layer BCL may be a portion that forms the cavity.

The antenna layer ANL may be disposed between the display panel DP and the lower member CM. The antenna layer ANL may be disposed between the protective film PL and the lower member CM. The antenna layer ANL may include an antenna that transmits, receives, or transmits/receives a wireless communication signal, for example, a radio frequency signal. The antenna layer ANL may be referred to as the radio frequency device layer. The antenna layer ANL may include a plurality of antennas, and the plurality of antennas may transmit, receive, or transmit/receive signals in the same frequency band, or may transmit, receive, or transmit/receive signals in different frequency bands.

The antenna layer ANL may be a film type antenna. In this embodiment, the antenna layer ANL may be disposed between the protective film PL and the lower member CM.

The antenna layer ANL may be attached to at least one of the protective film PL or the lower member CM, or may be inserted between the protective film PL and the lower member CM without being attached thereto. Alternatively, the antenna layer ANL may include an antenna directly disposed (or, formed) on the lower member CM.

According to an embodiment of the present disclosure, the cavity in which the energy radiated from the transmission line included in the antenna layer ANL resonates may be defined by the display area DA of the display panel DP, the lower conductive layer BCL of the lower member CM, a conductive partition wall facing the transmission line, and a sidewall EDCS of the housing EDC (refer to FIG. 1). The energy SGL resonating in the cavity may be radiated through the non-display area NDA.

Figure 4A:
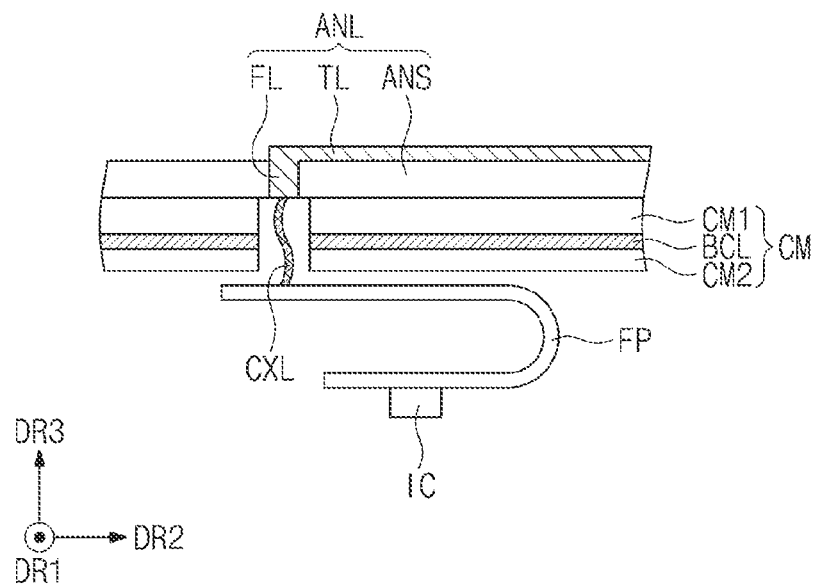
FIG. 4A is an enlarged sectional view illustrating some components of the electronic device according to an embodiment of the present disclosure.

FIG. 4A is an enlarged sectional view illustrating some components of the electronic device according to an embodiment of the present disclosure.

FIG. 4A illustrates the antenna layer ANL, the lower member CM, a circuit board FP on which a chip IC generating a radio signal is mounted, and a feeding line CXL connecting the circuit board FP and the antenna layer ANL.

Referring to FIG. 4A, the antenna layer ANL may include an antenna film ANS, a transmission line TL disposed on the antenna film ANS, and a feeding portion FL extending from the transmission line TL.

The transmission line TL may be disposed on one surface of the antenna film ANS, and the feeding portion FL may extend from the transmission line TL and may pass through the antenna film ANS in the thickness direction.

The circuit board FP may be disposed under the lower member CM, and the feeding line CXL may connect the circuit board FP and the antenna layer ANL together. For example, the feeding portion FL of the antenna layer ANL is connected to the circuitboard CXL by the feeding line CXL. The feeding line CXL may be referred to as the coaxial tube, the coaxial cable, or the coaxial line. An opening is defined in the lower member CM through which the feeding line CXL passes. That is, the opening may penetrate from the uppermost surface to the lowermost surface of the lower member CM.

Figure 4B:
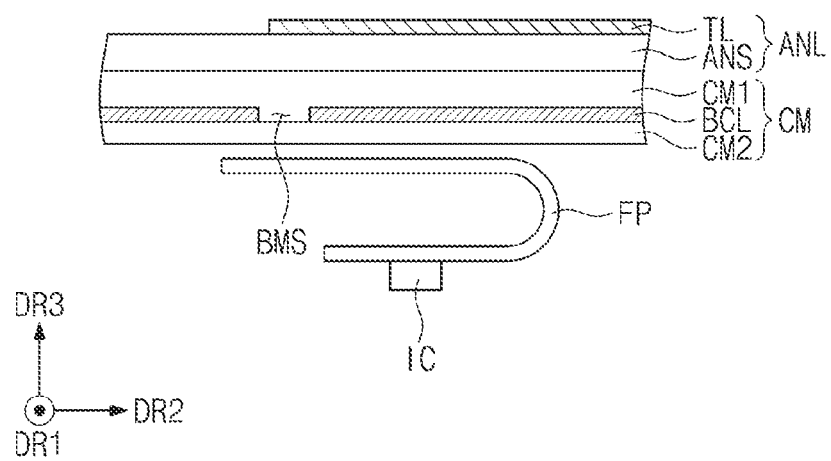
FIG. 4B is an enlarged sectional view illustrating some components of the electronic device according to an embodiment of the present disclosure.

FIG. 4B is an enlarged sectional view illustrating some components of the electronic device according to an embodiment of the present disclosure.

FIG. 4B illustrates the antenna layer ANL, the lower member CM, and a circuit board FP on which a chip IC generating a radio signal is mounted.

Referring to FIG. 4B, the antenna layer ANL may include an antenna film ANS and a transmission line TL disposed on the antenna film ANS. A slot BMS may be defined in the lower conductive layer BCL of the lower member CM. The slot BMS may be defined by removing a portion of the lower conductive layer BCL. The transmission line TL may not be directly connected to the circuit board FP. A signal provided from the circuit board FP may be proximity coupled feed to the transmission line TL through the slot BMS.

Figure 5:
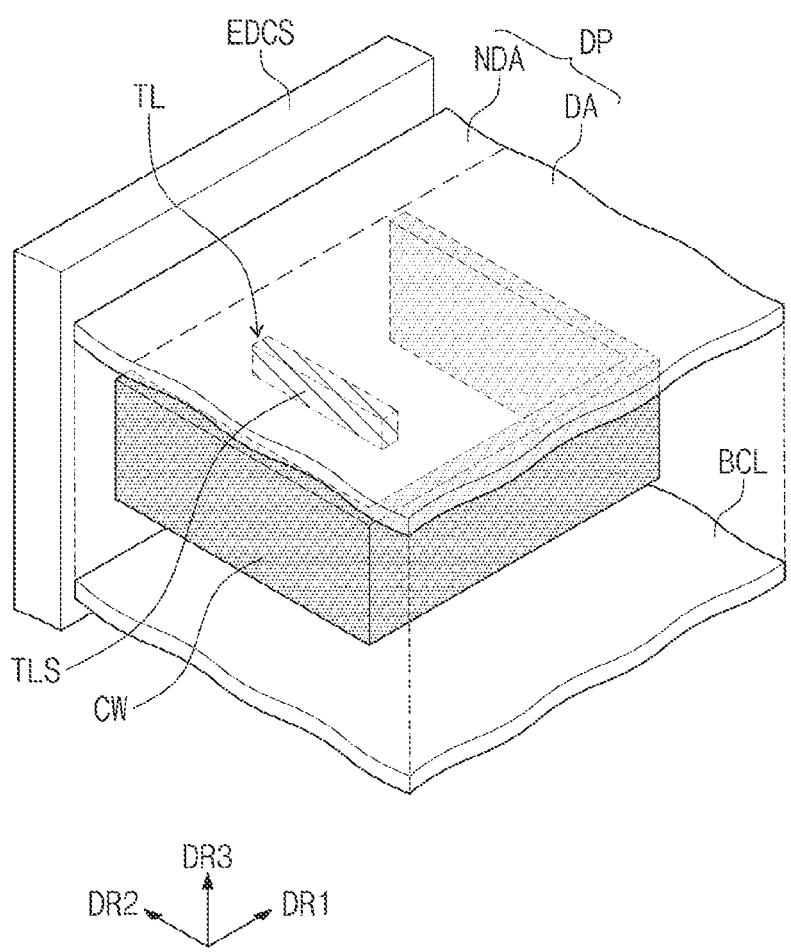
FIG. 5 is a perspective view illustrating some components of the electronic device according to an embodiment of the present disclosure.

FIG. 5 is a perspective view illustrating some components of the electronic device according to an embodiment of the present disclosure.

Referring to FIG. 5, the display panel DP, a transmission line TL, a conductive partition wall CW, the lower conductive layer BCL, and the housing sidewall EDCS are illustrated.

The conductive partition wall CW may be spaced apart from the transmission line TL and may overlap the display area DA of the display panel DP. The conductive partition wall CW may face at least some of the side surfaces TLS of the transmission line TL. In the embodiment illustrated in FIG. 5, the conductive partition wall CW may face three side surfaces TLS of the transmission line TL.

Energy radiated from the transmission line TL may resonate in the space (or, cavity) defined by the display area DA of the display panel DP, the lower conductive layer BCL, the conductive partition wall CW, and the housing sidewall EDCS and may be radiated through the non-display area NDA of the display panel DP.

According to this embodiment, because the transmission line TL is disposed under the display panel DP, the visibility of the display panel DP may not be obstructed, as compared with when the antenna is disposed over the display panel DP. Furthermore, a feeding line to the antenna may not be separately designed, and thus the difficulty level of design may be decreased. In addition, because the antenna is disposed under the display panel DP, the sensing sensitivity of the sensor layer ISL (refer to FIG. 3A) may not decrease, as compared with when the antenna is disposed over the sensor layer ISL (refer to FIG. 3A).

Figure 6:
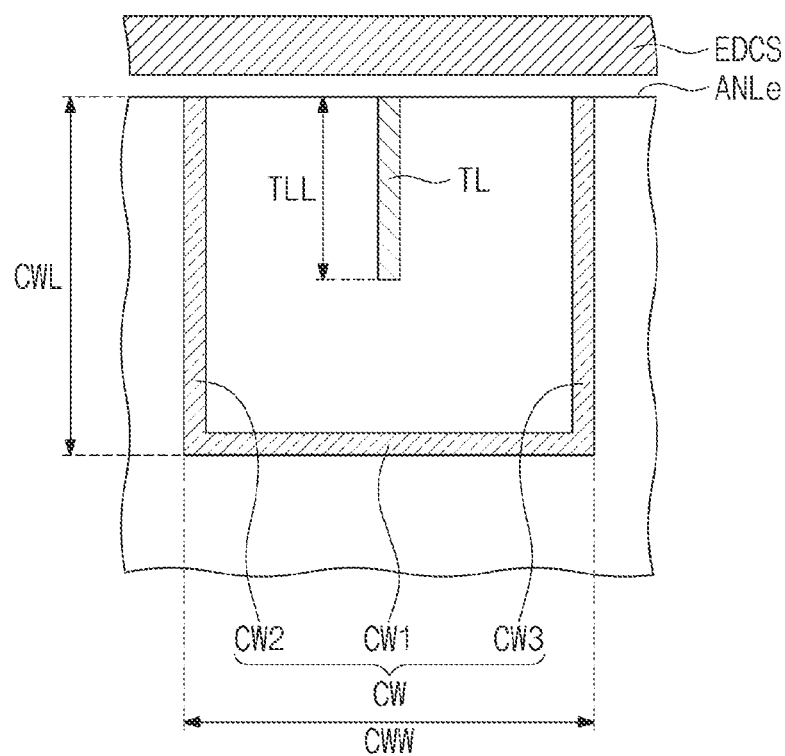
FIG. 6 is a plan view illustrating some components of the electronic device according to an embodiment of the present disclosure.
Figure 6:
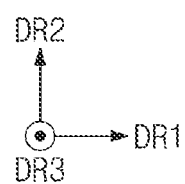
Figure 7A:
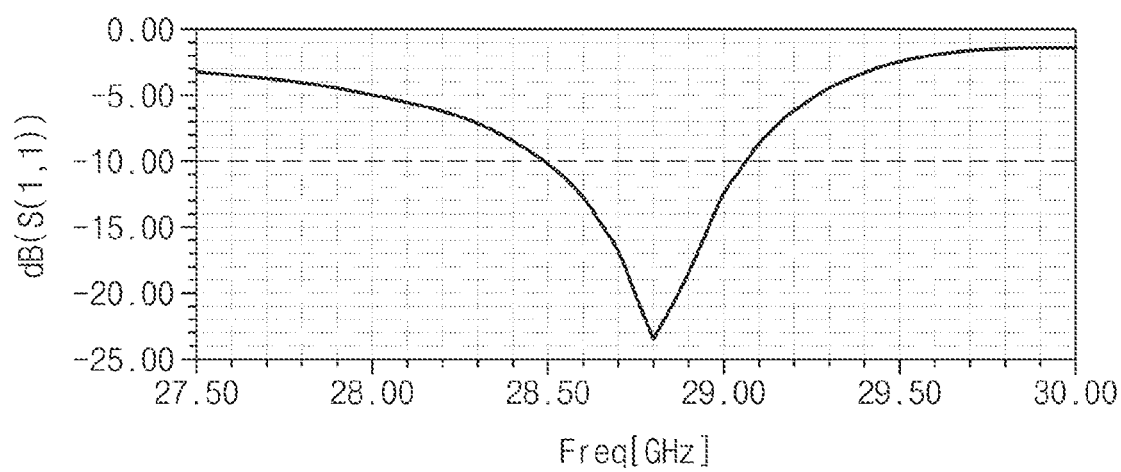
FIG. 7A is a graph depicting reflection coefficient versus frequency according to an embodiment of the present disclosure.
Figure 7B:
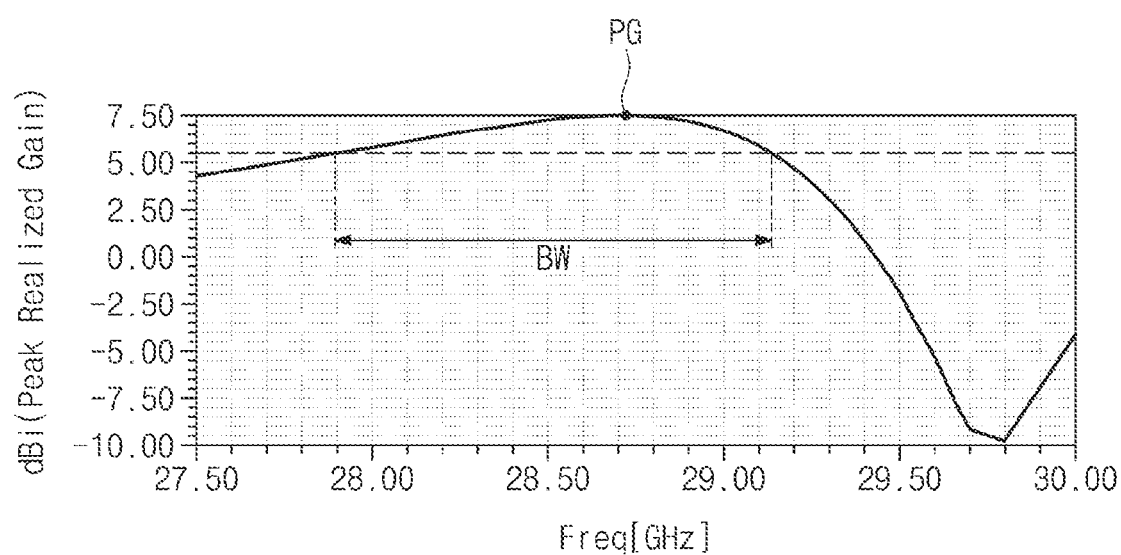
FIG. 7B is a graph depicting gain versus frequency according to an embodiment of the present disclosure.

FIG. 6 is a plan view illustrating some components of the electronic device according to an embodiment of the present disclosure. FIG. 7A is a graph depicting reflection coefficient versus frequency according to an embodiment of the present disclosure. FIG. 7B is a graph depicting gain versus frequency according to an embodiment of the present disclosure.

Referring to FIG. 6, the transmission line TL, the conductive partition wall CW, and the housing sidewall EDCS are illustrated. The transmission line TL may be surrounded by the conductive partition wall CW and the housing sidewall ECDS when viewed from above the plane.

Although FIG. 6 illustrates an example that an edge ANLe of the antenna layer ANL (refer to FIG. 3A) is spaced apart from the housing sidewall EDCS, the present disclosure is not particularly limited thereto. For example, the edge ANLe of the antenna layer ANL (refer to FIG. 3A) may be brought into contact with the housing sidewall EDCS.

The conductive partition wall CW may include a first partition wall CW1 extending parallel to the housing sidewall EDCS, a second partition wall CW2 extending toward the housing sidewall EDCS from a first end portion of the first sidewall CW1, and a third sidewall CW3 extending toward the housing sidewall EDCS from a second end portion of the first partition wall CW1 that is spaced apart from the first end portion.

When viewed from above the plane, the spaces on the upper and lower sides of the transmission line TL may be shielded by the housing sidewall EDCS and the first partition wall CW1, and the spaces on the left and right sides of the transmission line TL may be shielded by the second partition wall CW2 and the third partition wall CW3.

The antenna including the transmission line TL may operate in the 5G mmWave frequency band, for example, in the frequency range of 24 GHz to 40 GHz. In this case, the length TLL along the second direction DR2 of the transmission line TL may range about from 1 mm to 6 mm, and the length CWW along the first direction DR1 of the first partition wall CW1 and the lengths CWL of the second partition wall CW2 and the third partition wall CW3 along the second direction DR2 may range from about 3 mm to 10 mm.

FIGS. 7A and 7B are graphs depicting reflection coefficient versus frequency and gain versus frequency when the length TLL of the transmission line TL is 5.3 mm, the length CWW of the first partition wall CW1 is 10 mm, and the lengths CWL of the second sidewall CW2 and the third sidewall CW3 are 7.5 mm.

Referring to FIG. 7A, the bandwidth at −10 dB may range from about 28.49 GHz to about 29.06 GHz. Referring to FIG. 7B, the maximum gain PG may be 7.5 dBi at 28.7 GHz, the gain may be greater than or equal to (the maximum gain PG −2 dBi) in the frequency range of about 27.88 GHz to 29.14 GHz, and the bandwidth BW may be 1.26 GHz.

Figure 8:
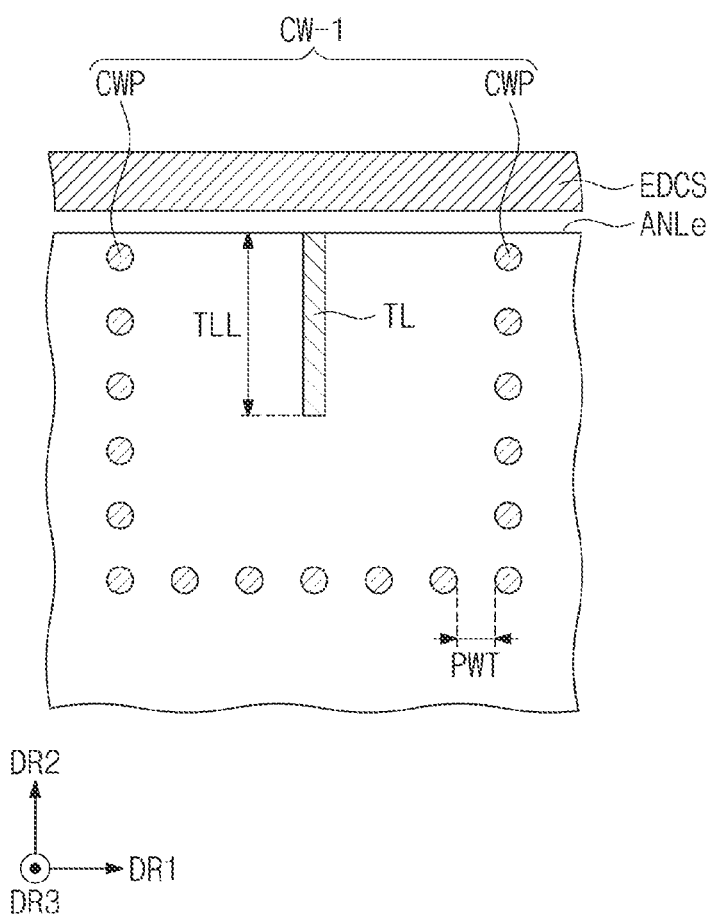
FIG. 8 is a plan view illustrating some components of the electronic device according to an embodiment of the present disclosure.

FIG. 8 is a plan view illustrating some components of the electronic device according to an embodiment of the present disclosure.

Referring to FIG. 8, a conductive partition wall CW-1 may include a plurality of conductive posts CWP.

The transmission line TL may be surrounded by the plurality of conductive posts CWP and the housing sidewall ECDS when viewed from above the plane. The gap distance PWT between two conductive posts CWP adjacent to each other among the plurality of conductive posts CWP may be smaller than the wavelength of energy radiated from the transmission line TL.

Although FIG. 8 illustrates an example that the conductive posts CWP have a cylindrical shape with a circular cross-section on the plane, the shape of the conductive posts CWP is not particularly limited thereto. For example, the conductive posts CWP may be implemented in a polygonal, irregular, or oval shape on the plane.

Figure 9:
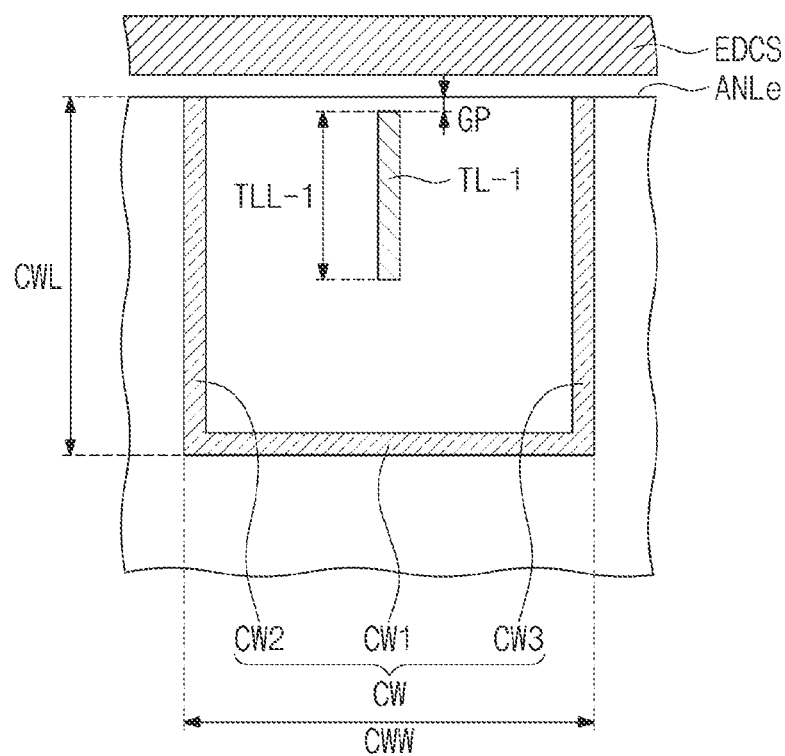
FIG. 9 is a plan view illustrating some components of the electronic device according to an embodiment of the present disclosure.
Figure 10A:
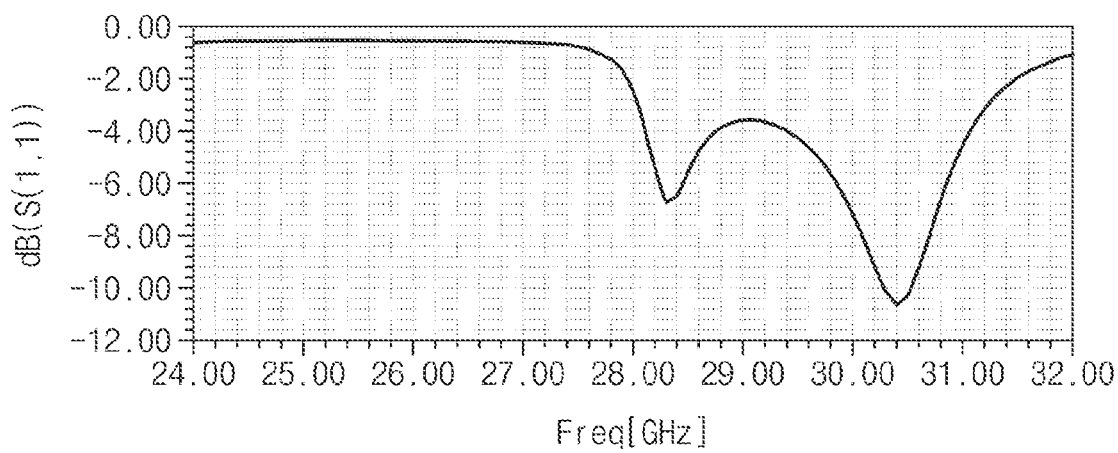
FIG. 10A is a graph depicting reflection coefficient versus frequency according to an embodiment of the present disclosure.
Figure 10B:
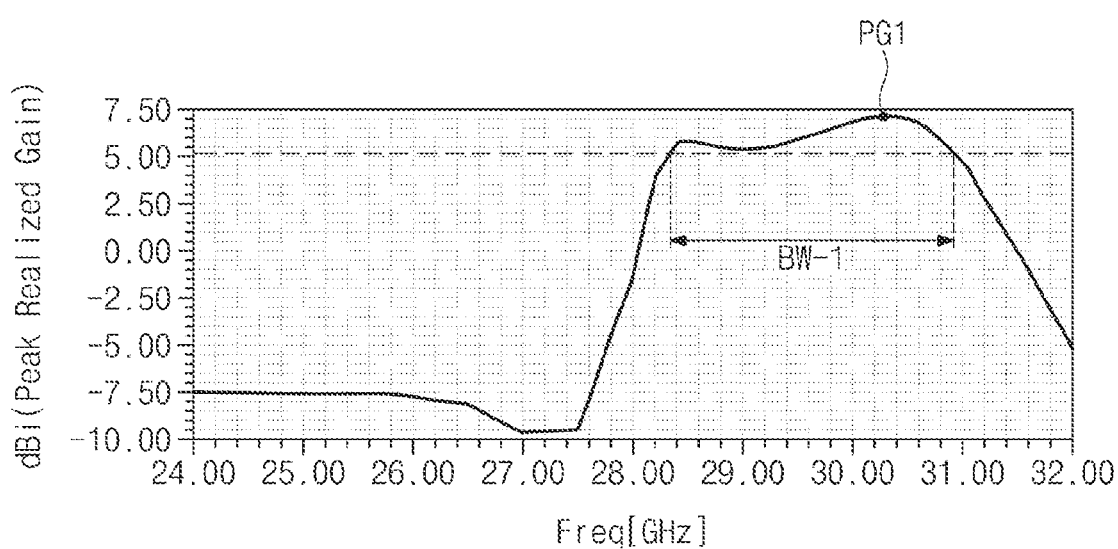
FIG. 10B is a graph depicting gain versus frequency according to an embodiment of the present disclosure.

FIG. 9 is a plan view illustrating some components of the electronic device according to an embodiment of the present disclosure. FIG. 10A is a graph depicting reflection coefficient versus frequency according to an embodiment of the present disclosure. FIG. 10B is a graph depicting gain versus frequency according to an embodiment of the present disclosure.

Referring to FIG. 9, a transmission line TL-1, the conductive partition wall CW, and the housing sidewall EDCS are illustrated. The transmission line TL-1 may be surrounded by the conductive partition wall CW and the housing sidewall ECDS when viewed from above the plane.

The transmission line TL-1 may be spaced apart from the edge ANLe of the antenna layer ANL (refer to FIG. 3A) by a predetermined gap distance GP. The conductive partition wall CW may include the first partition wall CW1 extending parallel to the housing sidewall EDCS, the second partition wall CW2 extending toward the housing sidewall EDCS from the first end portion of the first sidewall CW1, and the third sidewall CW3 extending toward the housing sidewall EDCS from the second end portion of the first partition wall CW1 that is spaced apart from the first end portion. When viewed from above the plane, the spaces on the upper and lower sides of the transmission line TL-1 may be shielded by the housing sidewall EDCS and the first partition wall CW1, and the spaces on the left and right sides of the transmission line TL-1 may be shielded by the second partition wall CW2 and the third partition wall CW3. Each of the length CWL of the second partition wall CW2 and the length CWW of the first partition wall CW1 is larger than the length TLL-1 of the transmission line TL-1.

FIGS. 10A and 10B are graphs depicting reflection coefficient versus frequency and gain versus frequency when the length TLL-1 of the transmission line TL-1 is 5.2 mm, the length CWW of the first partition wall CW1 is 10 mm, the lengths CWL of the second sidewall CW2 and the third sidewall CW3 are 7.5 mm, and the distance GP is 0.1 mm.

Referring to FIG. 10A, the bandwidth at −10 dB may be decreased, compared to that in the graph illustrated in FIG. 7A. Referring to FIG. 10B, the maximum gain PG1 may be 7.19 dBi at about 30.25 GHz, the gain may be greater than or equal to (the maximum gain PG1 −2 dBi) in the frequency range of about 28.33 GHz to 30.91 GHz, and the bandwidth BW-1 may be 2.58 GHz. The bandwidth BW-1 illustrated in FIG. 10B may be wider than the bandwidth BW in the graph of FIG. 7B.

Figure 11:
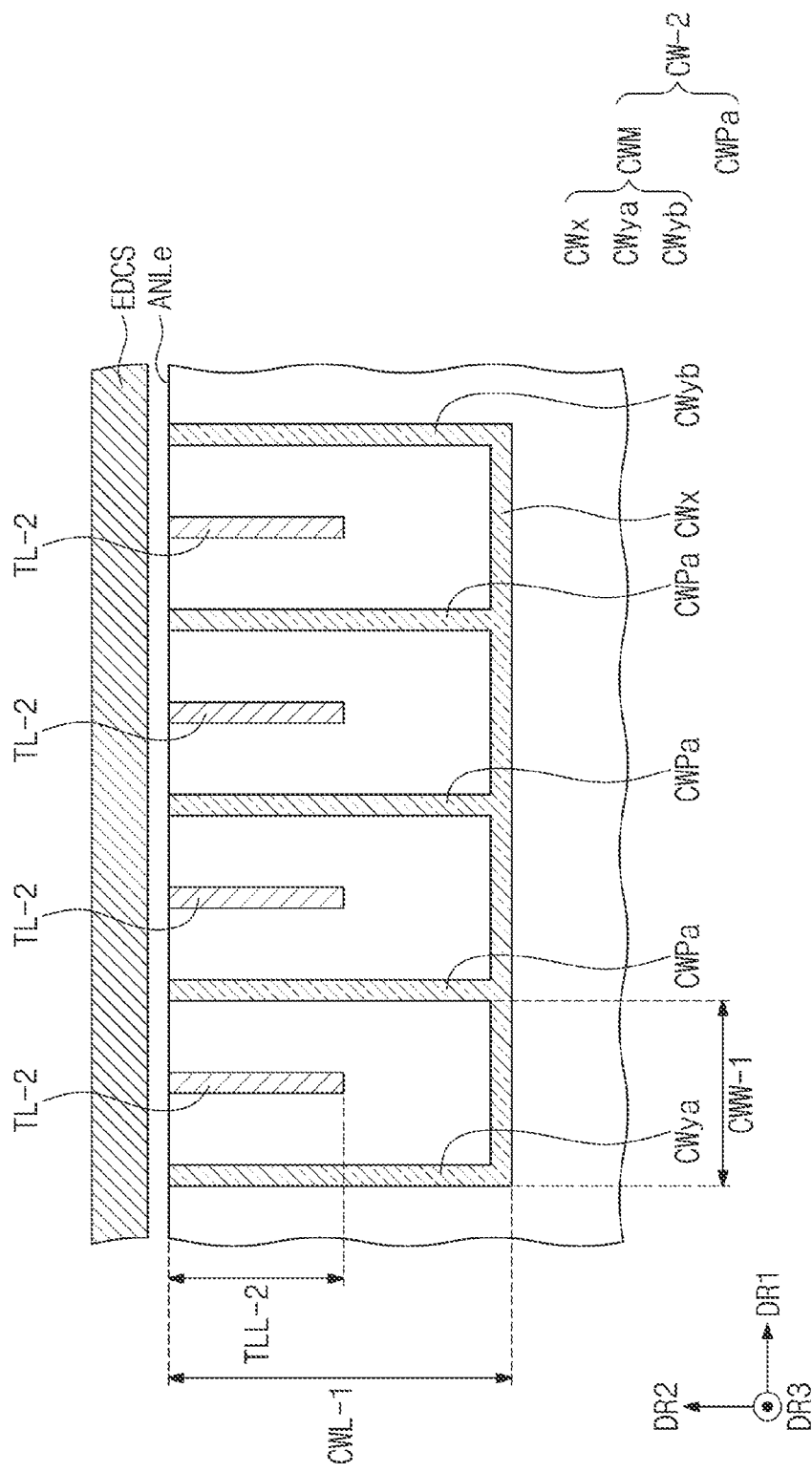
FIG. 11 is a plan view illustrating some components of the electronic device according to an embodiment of the present disclosure.
Figure 12A:
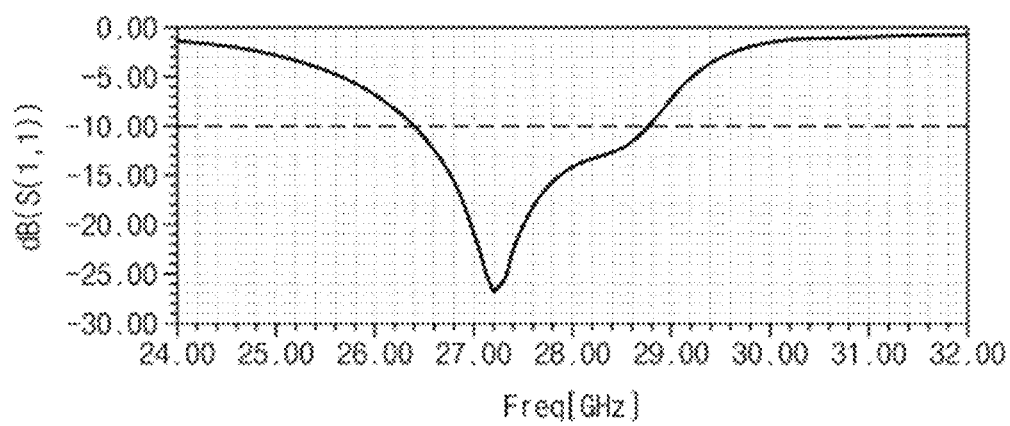
FIG. 12A is a graph depicting reflection coefficient versus frequency according to an embodiment of the present disclosure.
Figure 12B:
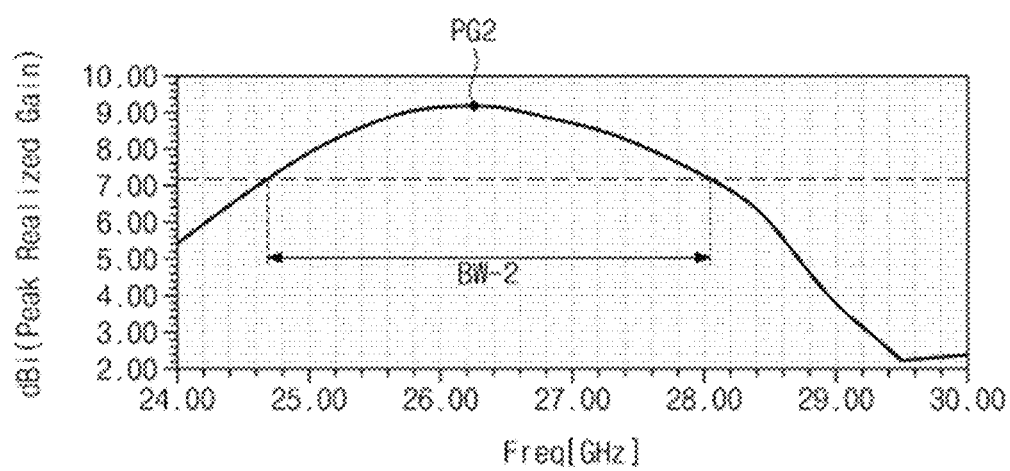
FIG. 12B is a graph depicting gain versus frequency according to an embodiment of the present disclosure.

FIG. 11 is a plan view illustrating some components of the electronic device according to an embodiment of the present disclosure. FIG. 12A is a graph depicting reflection coefficient versus frequency according to an embodiment of the present disclosure. FIG. 12B is a graph depicting gain versus frequency according to an embodiment of the present disclosure.

Referring to FIGS. 11, 12A, and 12B, a plurality of transmission lines TL-2 may be provided. For example, four transmission lines TL-2 are illustrated in FIG. 11. The four transmission lines TL-2 may implement one array antenna. However, this is illustrative, and the number of transmission lines TL-2 constituting an array antenna is not limited thereto. For example, the number of transmission lines TL-2 may be 3 or less or, 5 or more.

The transmission lines TL-2 may be arranged to be spaced apart from each other in the extension direction of the housing sidewall EDCS. For example, the transmission lines TL-2 may be arranged to be spaced apart from each other in the first direction DR1.

A conductive partition wall CW-2 may include an outer partition wall CWM and dividing partition walls CWPa. For example, the outer partition wall CWM may surround the transmission lines TL-2, and the dividing partition walls CWPa may extend from the outer partition wall CWM.

The outer partition wall CWM may include a first outer partition wall portion CWx extending in the first direction DR1, a second outer partition wall portion CWya extending from one end of the first outer partition wall portion CWx in the second direction DR2 toward the housing sidewall EDCS, and a third outer partition wall portion CWyb extending from an opposite end of the first outer partition wall portion CWx in the second direction DR2 toward the housing sidewall EDCS. The dividing partition walls CWPa may extend from the first outer partition wall portion CWx in the second direction DR2 toward the housing sidewall EDCS. Each of the dividing partition walls CWPa may be disposed between two transmission lines adjacent to each other among the transmission lines TL-2. The length CWL-1 of the second outer partition wall portion CWya and the length CWW-1 of a portion of the first outer partition wall portion CWx are larger than the length TTL-2 of the transmission lines TL-2.

FIGS. 12A and 12B are graphs depicting reflection coefficient versus frequency and gain versus frequency when the lengths TLL-2 of the transmission lines TL-2 are 1 mm, the length CWL-1 of the second outer partition wall portion CWya is 8 mm, and the length CWW-1 of a portion of the first outer partition wall portion CWx is 3 mm.

Referring to FIG. 12A, the bandwidth at −10 dB may increase, compared to that in the graph illustrated in FIG. 7A. Referring to FIG. 12B, the maximum gain PG2 may be 9.18 dBi at about 26.1 GHz, the gain may be greater than or equal to (the maximum gain PG2 −2 dBi) in the frequency range of about 24.68 GHz to 28.05 GHz, and the bandwidth BW-2 may be 3.37 GHz. The bandwidth BW-2 illustrated in FIG. 10B may be wider than the bandwidth BW in the graph of FIG. 7B.

Figure 13:
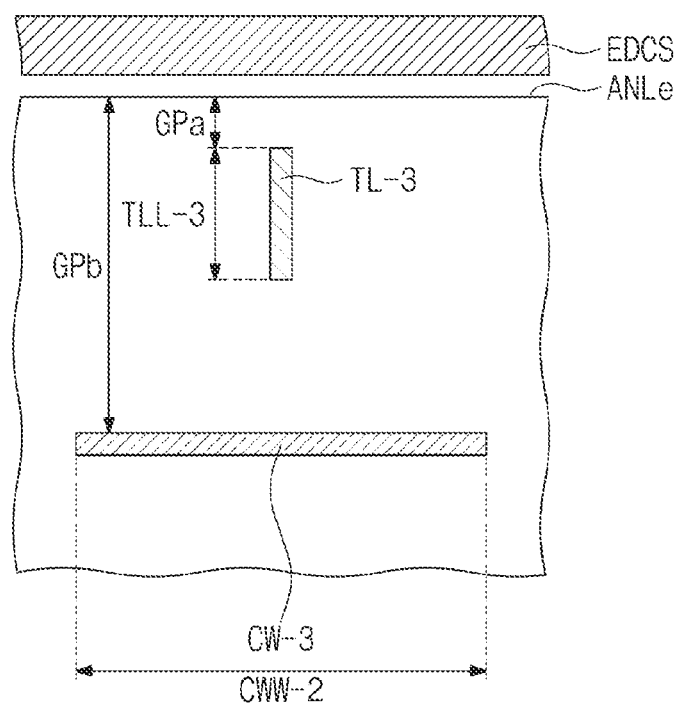
FIG. 13 is a plan view illustrating some components of the electronic device according to an embodiment of the present disclosure.
Figure 14A:
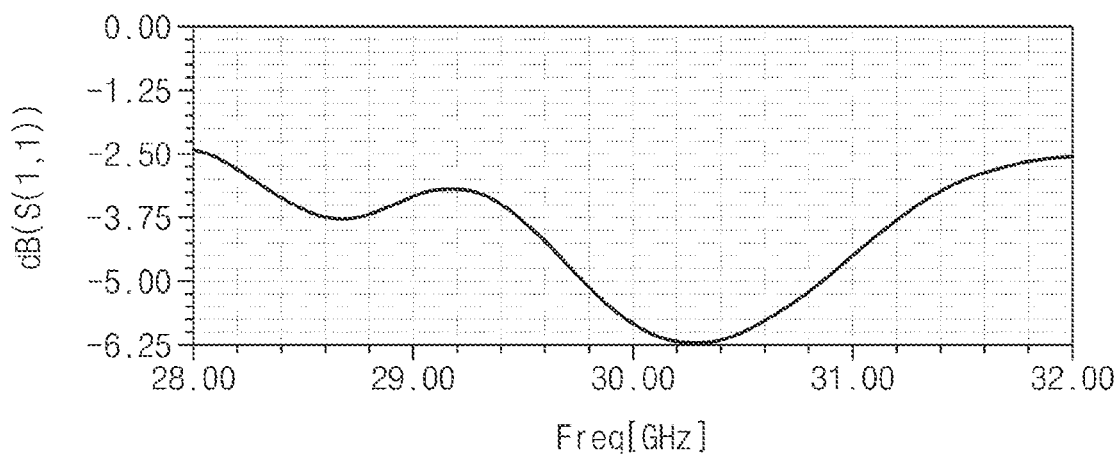
FIG. 14A is a graph depicting reflection coefficient versus frequency according to an embodiment of the present disclosure.
Figure 14B:
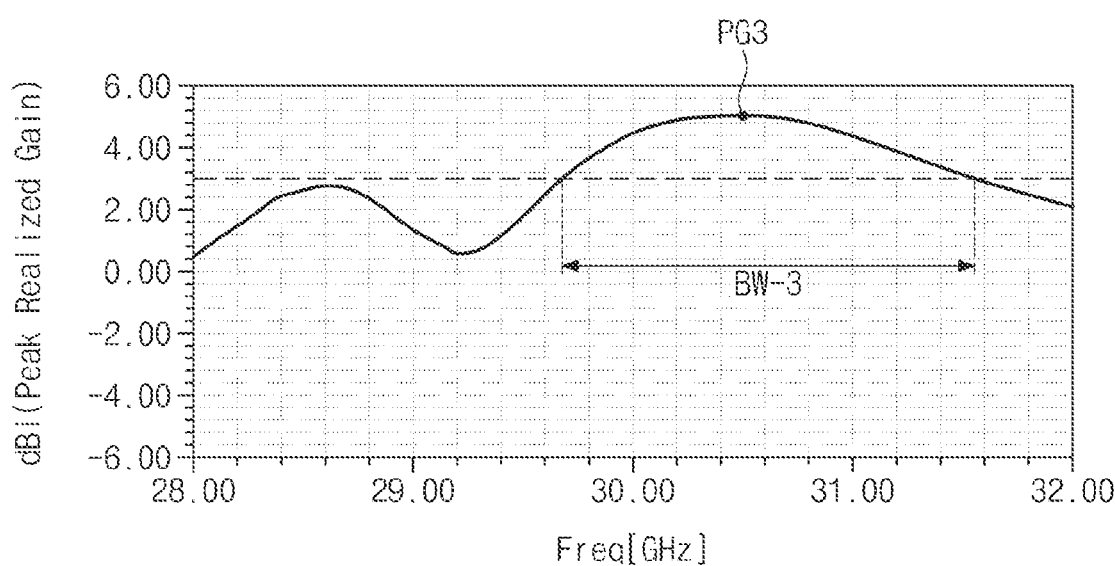
FIG. 14B is a graph depicting gain versus frequency according to an embodiment of the present disclosure.

FIG. 13 is a plan view illustrating some components of the electronic device according to an embodiment of the present disclosure. FIG. 14A is a graph depicting reflection coefficient versus frequency according to an embodiment of the present disclosure. FIG. 14B is a graph depicting gain versus frequency according to an embodiment of the present disclosure.

Referring to FIG. 13, a transmission line TL-3, a conductive partition wall CW-3, and the housing sidewall EDCS are illustrated.

The conductive partition wall CW-3 may extend parallel to the housing sidewall EDCS. For example, the conductive partition wall CW-3 and the housing sidewall EDCS may extend in the first direction DR1. The transmission line TL-3 may be disposed between the conductive partition wall CW-3 and the housing sidewall ECDS when viewed from above the plane.

The transmission line TL-3 may be spaced apart from the edge ANLe of the antenna layer ANL (refer to FIG. 3A) by a first gap distance GPa along the second direction DR2. The conductive partition wall CW-3 may be spaced apart from the edge ANLe of the antenna layer ANL (refer to FIG. 3A) by a second gap distance GPb along the second direction DR2. The spaces on the upper and lower sides of the transmission line TL-3 may be shielded by the housing sidewall ECDS and the conductive partition wall CW-3 when viewed from above the plane. According to the embodiment illustrated in FIG. 13, the shape of the conductive partition wall CW-3 may be simplified, and thus a manufacturing process may be more easily performed. The length CWW-2 of the conductive partition wall CW-3 is larger than the length TLL-3 of the transmission line TL-3. The first gap distance GPa is smaller than the second gap distance GPb.

FIGS. 14A and 14B are graphs depicting reflection coefficient versus frequency and gain versus frequency when the length TLL-3 of the transmission line TL-3 is 1.6 mm, the length CWW-2 of the conductive partition wall CW-3 is 8 mm, the first gap distance GPa is 2 mm, and the second gap distance GPb is 5 mm.

Referring to FIGS. 13 and 14A, when viewed from above the plane, the spaces on the left and right sides of the transmission line TL-3 may be open, and therefore reflection coefficient performance may be degraded. Referring to FIG. 14B, the maximum gain PG3 may be 4.94 dBi at about 30.50 GHz, the gain may be greater than or equal to (the maximum gain PG3 −2 dBi) in the frequency range of about 29.68 GHz to 31.55 GHz, and the bandwidth BW-3 may be 1.87 GHz.

Figure 15:
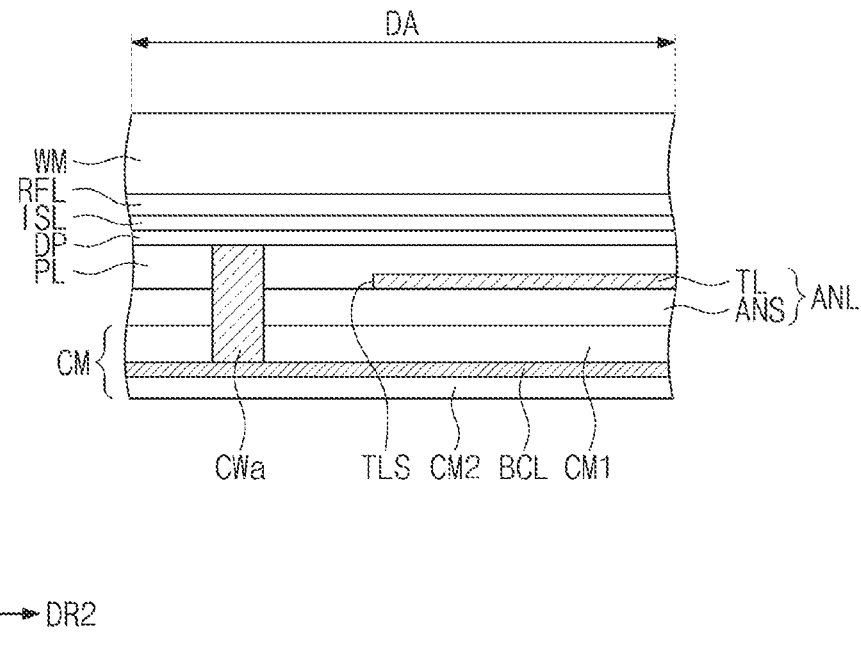
FIG. 15 is a sectional view illustrating a portion of the electronic device according to an embodiment of the present disclosure.

FIG. 15 is a sectional view illustrating a portion of the electronic device according to an embodiment of the present disclosure.

Referring to FIG. 15, a conductive partition wall CWa may face a side surface TLS of the transmission line TL along the second direction DR2. The conductive partition wall CWa illustrated in FIG. 15 may correspond to one of the conductive partition walls CW, CW-1, CW-2, and CW-3 described above with reference to FIGS. 6, 8, 9, 11, and 13.

The conductive partition wall CWa may be connected to the lower conductive layer BCL of the lower member CM and the display panel DP. For example, an opening penetrating the protective film PL, the antenna film ANS, and the first lower layer CM1 may be defined so that a conductive material may be provided in the opening to form the conductive partition wall CWa.

Figure 16:
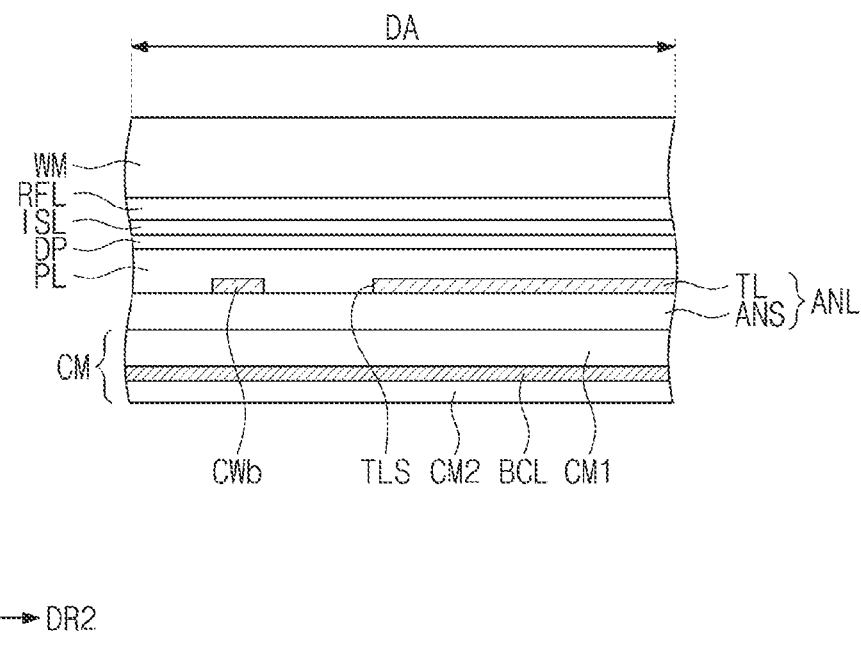
FIG. 16 is a sectional view illustrating a portion of the electronic device according to an embodiment of the present disclosure.

FIG. 16 is a sectional view illustrating a portion of the electronic device according to an embodiment of the present disclosure.

Referring to FIG. 16, a conductive partition wall CWb may face a side surface TLS of the transmission line TL along the second direction DR2. The conductive partition wall CWb illustrated in FIG. 16 may correspond to one of the conductive partition walls CW, CW-1, CW-2, and CW-3 described above with reference to FIGS. 6, 8, 9, 11, and 13.

The conductive partition wall CWb may be provided on the antenna film ANS. That is, the transmission line TL and the conductive partition wall CWb may be disposed on the same layer.

Figure 17:
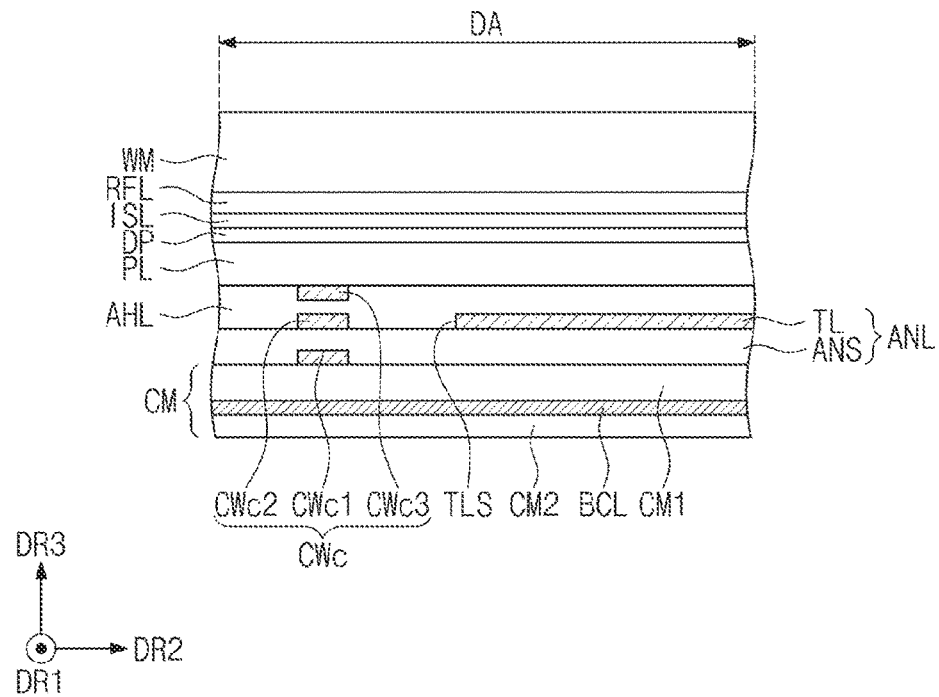
FIG. 17 is a sectional view illustrating a portion of the electronic device according to an embodiment of the present disclosure.

FIG. 17 is a sectional view illustrating a portion of the electronic device according to an embodiment of the present disclosure.

Referring to FIG. 17, a conductive partition wall CWc may include a plurality of conductive partition wall layers CWc1, CWc2, and CWc3. The conductive partition wall CWc illustrated in FIG. 17 may correspond to one of the conductive partition walls CW, CW-1, CW-2, and CW-3 described above with reference to FIGS. 6, 8, 9, 11, and 13.

The conductive partition wall CWc may include the first conductive partition wall layer CWc1 disposed on the lower member CM, the second conductive partition wall layer CWc2 disposed on the antenna film ANS, and the third conductive partition wall layer CWc3 disposed on one surface of the protective film PL. That is, the second conductive partition wall layer CWc2 and the third conductive partition wall layer CWc3 may face each other. The embodiment illustrated in FIG. 17 is merely illustrative, and one of the first, second, and third conductive partition wall layers CWc1, CWc2, and CWc3 may be omitted. Furthermore, the positions of the first and third conductive partition wall layers CWc1 and CWc3 may be changed.

Although FIG. 17 illustrates an example that an adhesive layer AHL is disposed between the protective film PL and the antenna layer ANL such that the second conductive partition wall layer CWc2 and the third conductive partition wall layer CWc3 are spaced apart from each other, the present disclosure is not particularly limited thereto. For example, the adhesive layer AHL may be omitted from a portion between the second conductive partition wall layer CWc2 and the third conductive partition wall layer CWc3, and the second conductive partition wall layer CWc2 and the third conductive partition wall layer CWc3 may be in contact with each other.

Figure 18:
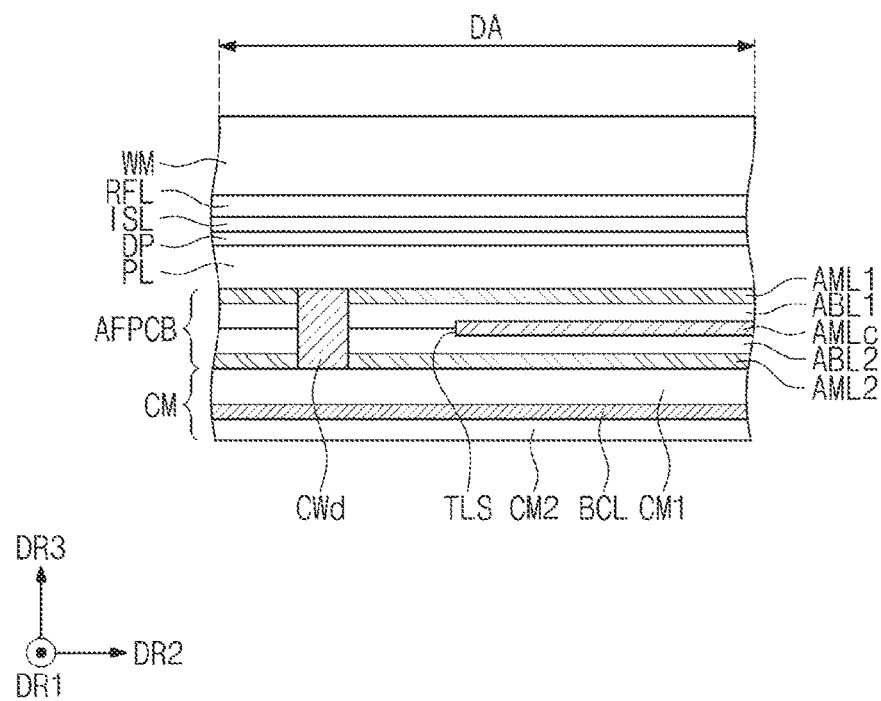
FIG. 18 is a sectional view illustrating a portion of the electronic device according to an embodiment of the present disclosure.

FIG. 18 is a sectional view illustrating a portion of the electronic device according to an embodiment of the present disclosure.

Referring to FIG. 18, a printed circuit film AFPCB may be disposed between the display panel DP and the lower member CM. The printed circuit film AFPCB may be disposed between the protective film PL and the lower member CM.

The printed circuit film AFPCB may include a first conductive layer AML1, a first base film ABL1, a conductive circuit layer AMLc including a transmission line, a second base film ABL2, and a second conductive layer AML2 that are sequentially stacked one above another.

A conductive partition wall CWd may be provided in the printed circuit film AFPCB. For example, the conductive partition wall CWd may pass through between the first base film ABL1 and the second base film ABL2, and may be connected to the first conductive layer AML1 and the second conductive layer AML2. The conductive partition wall CWd illustrated in FIG. 18 may correspond to one of the conductive partition walls CW, CW-1, CW-2, and CW-3 described above with reference to FIGS. 6, 8, 9, 11, and 13.

As described above, the transmission line may be disposed under the display panel. Energy radiated from the transmission line may resonate in the space (or, cavity) defined by the display area of the display panel, the lower conductive layer, the conductive partition wall, and the housing sidewall and may be radiated through the non-display area of the display panel. Because the transmission line is disposed under the display panel, the visibility of the display panel may not be obstructed, as compared with when the antenna is disposed over the display panel. Furthermore, a feeding line to the antenna may not be separately designed, and thus the difficulty level of design may be decreased. In addition, because the antenna is disposed under the display panel, the sensing sensitivity of the sensor layer may not be decreased, as compared with when the antenna is disposed over the sensor layer.

While the present disclosure has been described with reference to embodiments thereof, it will be apparent to those of ordinary skill in the art that various changes and modifications may be made thereto without departing from the spirit and scope of the present disclosure as set forth in the following claims. Accordingly, the scope of the present disclosure should not be limited or determined by the described embodiments, and should be determined by the accompanying claims and the equivalents thereof.

What is claimed is:
1. An electronic device comprising:
a window;
a display panel disposed under the window, the display panel having a display area and a non-display area defined therein;
a lower member disposed under the display panel, the lower member including a lower conductive layer;
a transmission line disposed between the display panel and the lower member;
a conductive partition wall spaced apart from the transmission line and disposed to overlap the display area; and
a housing coupled with the window to define a receiving space in which the display panel, the lower member, and the transmission line are disposed,
wherein energy radiated from the transmission line resonates in a space defined by the display area of the display panel, the lower conductive layer, the conductive partition wall, and a sidewall of the housing and is radiated through the non-display area of the display panel.

2. The electronic device of claim 1, wherein the conductive partition wall includes a first partition wall configured to extend parallel to the sidewall of the housing, a second partition wall configured to extend from a first end portion of the first partition wall toward the sidewall of the housing, and a third partition wall configured to extend from a second end portion of the first partition wall toward the sidewall of the housing, the second end portion being spaced apart from the first end portion.

3. The electronic device of claim 1, wherein the conductive partition wall includes a plurality of conductive posts, and the transmission line is surrounded by the plurality of conductive posts and the sidewall of the housing when viewed on a plane.

4. The electronic device of claim 1, wherein the conductive partition wall extends parallel to the sidewall of the housing, and the transmission line is disposed between the conductive partition wall and the sidewall of the housing.

5. The electronic device of claim 1, wherein the transmission line includes a plurality of transmission lines arranged to be spaced apart from each other in a direction parallel to the sidewall of the housing.

6. The electronic device of claim 5, wherein the conductive partition wall includes an outer partition wall configured to surround the plurality of transmission lines and a dividing partition wall disposed between two transmission lines adjacent to each other among the plurality of transmission lines.

7. The electronic device of claim 1, further comprising:
a feeding line connected to the transmission line,
wherein the lower member has an opening defined therein through which the feeding line passes.

8. The electronic device of claim 1, wherein a slot is defined in the lower conductive layer of the lower member, and a signal is proximity coupled feed to the transmission line through the slot.

9. The electronic device of claim 1, wherein the transmission line and the conductive partition wall are disposed on a same layer.

10. The electronic device of claim 1, wherein the conductive partition wall is connected to the lower conductive layer of the lower member and the display panel.

11. The electronic device of claim 10, further comprising:
a protective film disposed under the display panel; and
an antenna film disposed under the protective film, the antenna film having the transmission line disposed on one surface thereof,
wherein the conductive partition wall passes through the lower member, the antenna film, and the protective film.

12. The electronic device of claim 1, further comprising:
a protective film disposed under the display panel; and
an antenna film disposed under the protective film, the antenna film having the transmission line disposed on one surface thereof,
wherein the conductive partition wall includes a first conductive partition wall layer disposed on the lower member, a second conductive partition wall layer disposed on the antenna film, and a third conductive partition wall layer disposed on one surface of the protective film, and
wherein the second conductive partition wall layer and the third conductive partition wall layer face each other.

13. The electronic device of claim 1, further comprising:
a printed circuit film disposed between the display panel and the lower member,
wherein the printed circuit film includes a first base film, a second base film facing the first base film, and a conductive circuit layer disposed between the first base film and the second base film and including the transmission line.

14. The electronic device of claim 13, wherein the printed circuit film further includes a first conductive layer disposed on an upper surface of the first base film and a second conductive layer disposed on a lower surface of the second base film, and
wherein the conductive partition wall passes through the first base film and the second base film and is connected to the first conductive layer and the second conductive layer.

* * * * *